Patented July 5, 1932

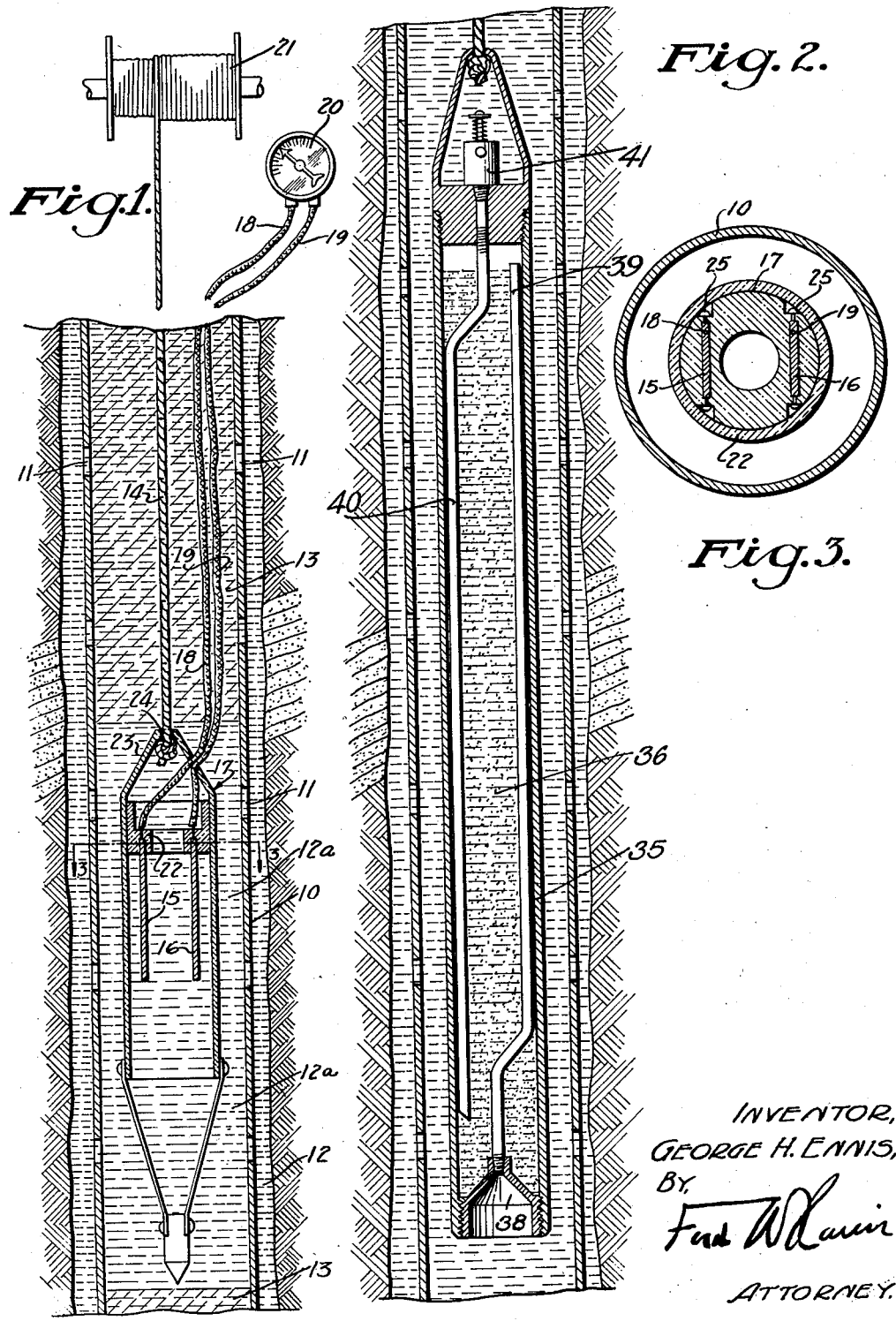

1,865,847

UNITED STATES PATENT OFFICE

GEORGE H. ENNIS, OF LONG BEACH, CALIFORNIA, ASSIGNOR OF ONE-HALF TO ROBERT V. FUNK, OF LONG BEACH, CALIFORNIA

METHOD OF LOCATING THE POINT OF ENTRY OF WATER INTO OIL WELLS

Application filed June 3, 1929. Serial No. 367,913.

This invention relates to a method for locating the point of entry of water into oil wells so that the place of leakage may be very accurately determined and to a method of depositing a treating solution in a well to prepare it for the testing of leakages.

It is an object of the invention to determine the place of water entry quickly, inexpensively, accurately, and without additional injury to the well.

This application is a continuation-in-part of my application Serial No. 80,160, filed January 9, 1926, and which issued into Patent No. 1,786,196 on Dec. 23, 1930, and my copending application for dose distributor, Serial No. 161,329, filed January 15, 1927, and which issued into Patent No. 1,725,979 on August 27, 1929.

The method constituting an important part of this invention is similar to the method disclosed in my copending application Serial No. 80,160, referred to above, and differs primarily in the method of placing the testing solution in the well.

This application discloses and claims a method of my invention for depositing a testing solution in the well as a unitary body or "batch", which does not dilute the liquid in the well but displaces it. To perform this part of my invention I use the dose distributor of my patent entitled Dose distributor No. 1,725,979, mentioned above, in which patent the method of using the dose distributor is fully disclosed and made a part hereof. This portion of my invention is very useful in connection with the other steps of the present method, and is furthermore useful in other processes of testing a well in view of the fact that this particular method of placing a testing solution in the well has many advantages. One important advantage is that when depositing the testing solution as a "batch" no consideration need be given to the character of the liquid already in the well. In those methods in which a chemical is distributed throughout the liquid in the well different chemicals might be required to suit different liquids. Furthermore, where the well is partly filled with oil, the oil must be removed because the chemical will not mix with it to form the desired testing solution.

In the complete process of testing the well which comprises a part of this invention, after the testing solution has been deposited in the well the hydrostatic head in the well is reduced which reduces the pressure on the formation and allows the connate liquid, which is usually fresh water or salt water, to seep or leak into the well. This leakage into the well dilutes the testing solution and forms a separating layer between upper and lower parts thereof. The next step in the process is to test the testing solution to determine the point at which it is diluted which indicates the point at which the leakage occurs. I prefer to accomplish this testing step of my invention by lowering a pair of plates into the well, which plates are connected in circuit with a suitable galvanometer or milliammeter. When the plates enter the testing solution, which is in the preferred form of my invention an electrolyte, they cooperate therewith to form a voltaic cell. The amount of current produced by this voltaic cell depends upon the concentration of the testing solution, and, of course, where the testing solution is diluted the current produced will be less than that of the normal testing solution. By watching the milliammeter it will be noted when the current drops off, and the operator will then know the level at which the leakage has occurred.

Other objects and particular features of my invention will be explained later.

A better understanding of the process and apparatus may be gained by referring to the accompanying drawing.

Fig. 1 shows a sectional elevation of a well in which the third electrical measuring step is being taken.

Fig. 2 shows a sectional elevation, within a well, of a dose distributor which I may use to distribute chemicals within the well.

Fig. 3 is a section taken on the line 3—3 of Fig. 1.

In Fig. 1, 10 represents a well casing in which there are openings 11 allowing underground water 12 to leak in. Water that has found such ingress into the casing is designated by 12a. The cross-hatched areas 13—13 represent a body of testing solution which has been deposited in the well.

Suspended by a cable 14, upon which graduations are marked, are metallic plates 15 and 16, held at a fixed distance apart by an insulating holder 17. The plates are connected through insulated wires 18 and 19 respectively to a millivoltmeter 20 at the surface of the earth. A cable reel or winch 21 is preferably provided to raise and lower the electrode plates. The cable is preferably coated, especially near the electrodes, with some non-conducting composition.

In Fig. 3, 15 indicates the electronegative metallic plate made preferably of 16 carat gold, while 16 is the electropositive plate made preferably of amalgamated zinc. The plates are held in fixed spatial relation to each other by an insulating ring 22, with which a bail 23 is connected. The wires 18 and 19 are indicated in cross-section. The bail 23 may be provided with a hole 24 or a hook to facilitate the attachment of the cable 14. Screws or pins 25 may be provided to hold the plates in the ring. The screws should either be made of the same material as the plate which they hold or of insulating material. The ring may be recessed to accommodate the plates and hold them rigid.

In operation the electropotential given by the liquid contained in the well is first observed by lowering the galvanic plates 15 and 16 into the well. An average of the readings of the millivoltmeter at different levels may be taken although the variation will seldom be found large. The testing solution is then introduced in the well, as previously mentioned, by using the dose distributor of my Patent No. 1,725,979, previously referred to, and is introduced by the following method. Referring particularly to Fig. 2, the dose distributor includes a shell 35 providing a chamber 36. At the lower end of the chamber 36 is a mouth 38 connected to the interior of the chamber by means of an inlet pipe 39 which extends to the upper end of the chamber. Connected to the upper end of the shell 35 is an outlet pipe 40 which extends, as shown, to the lower end of the chamber 36. Associated with the passage of the outlet pipe 40 is a valve 41. The details of construction of this type of dose distributor are clearly shown in my patent for dose distributor, and the details thereof are for this reason not given herein. The dose distributor does not constitute a part of this invention, while the method of depositing a treating solution does constitute a part of this invention. The treating solution is placed in the chamber 36, as illustrated in Fig. 2, and the valve 41 is closed. The dose distributor is then lowered into the well to a depth where it is believed that the leakage occurs and a sudden or quick jerk is given on the lowering rope which opens the valve 41. This opens the outlet 40 and permits the treating solution to be forced from the chamber 36. This is accomplished as follows: It will be seen that the mouth 38 is quite large and that the space around the dose distributor is relatively small so that when the dose distributor is lowered a pressure is created below the dose distributor, and this pressure will cause the liquid in the well to flow inward through the mouth 38 and the inlet pipe 39 into the upper end of the chamber. A pressure is, of course, at this time placed on the treating solution in the chamber 36 and the treating solution is forced from the chamber 36 through the outlet pipe 40. Therefore, it will be seen that when the treating solution has been forced from the dose distributor it has become filled with the liquid in the well. For this reason the hydrostatic head of the well is not increased or decreased, but the only action which has taken place is that a unitary body of treating solution has been deposited in the well at a desired depth. As previously mentioned, this step constitutes an important part of the invention since it enables the depositing of a unitary body or mass of treating solution without any consideration being given to the qualities of the liquids in the well, and for the further reason that such a depositing of treating solution may be made without at this time changing the hydrostatic condition of the well. In the preferred method of my invention I prefer to use a testing solution which has electrolytic qualities. It will of course be understood that the depositing of the testing solution in the well may be used in connection with other methods of testing wells, and obviously the testing solution would be varied to suit the method of testing the well, in connection with which the depositing operation is employed. In the method for testing wells disclosed herein I employ a testing solution which has electrochemical qualities. In other words, I employ a testing solution which is preferably in the form of an electrolyte. Various electrolytes may be used as a testing solution in this method, but, for reasons pointed out hereinafter, I prefer to use a solution containing ammonium sulfate, sodium sulfate and a colloidal material in a solution which is acid with sulfuric acid and chromic acid. It is obvious that other inorganic acids and ionized mineral salts might be used in place of those mentioned. The colloidal material may be an alcoholic fermentation product of waste molasses after the removal of alcohol therefrom. It is known technically as "slop". I make my solution as follows:

1 Slop solution (A) Take 10 gallons of concentrated slop.
(B) Take 5 gallons of water and add gradually ¾ gallon of sulfuric acid 66 degrees Bé. (C) Mix A and B and bring to boil, heat for ½ hour, let stand 12 hours. Siphon off 10 gallons.

2 *Ammonium sulfate solution*

Dissolve 300# of ammonium sulfate (fertilizer grade 25% ammonia) in 60 gallons of cold water.

3 *Sodium bichromate solution*

3½ parts (by weight) water, 3 parts (by weight) sodium bichromate, 1 part (by weight) 66 degrees Bé. sulfuric acid.

*Mixing*

(A) Take 90 gallons ammonium sulfate solution #2, add to this 10 gallons of slop solution #1 which will make up 100 gallons of A solution. Make up 150 gallons of sodium bichromate or B solution. Mix 4 parts by volume of A solution and 6 parts of B solution making 250 gallons of chemical solution to be distributed in fluid contents of well by patented dose distributor. The amount of solution used is 1 gallon of solution approximately to each 48 gallons of liquid in the well.

The object in using a colloidal material in the above solution is to give the solution sufficient viscosity to cause it to remain in the well where it is placed; that is, not to diffuse very rapidly. The colloid may, however, be dispensed with if desired. Starch solution and unfermented molasses solutions may also be used.

Using the gold and amalgamated zinc electrodes, the electro-potential developed when this solution is dispersed in the approximate ratio of 1 gallon solution to 48 gallons of water or salt water in the well, is 1.40 volts. In salt water of the concentration usually found in oil wells in California, the E. M. F. produced is 0.35 volts. In fresh water it is 0.2 volts and in distilled water it is zero.

Gold and zinc are not the only materials which are suitable for the electrode plates. Those which may be used are:

| Column 1 | Column 2 | Column 3 |
|---|---|---|
| The metals in this column may be used as electropositive plates to those in Columns 2 or 3 | The metals in this column may be used as electronegative plates to those in Column 1 or as electropositive plates to those in Column 3. | Electronegative plates |
| Aluminum Chromium Manganese Zinc Iron Cobalt | Nickel Lead Cadmium Tin Copper Silver Antimony Gold | Platinum Carbon |

The electro-potential given by the immersion of one set of plates in the ordinary water of the well now being known, and the electrochemical testing solution now having been deposited in the water, the electro-potential given by the same set of plates in the electrochemical testing solution is now measured by lowering the plates into the well. An average of these readings in the electrochemical testing solution may be taken for very accurate work.

The hydrostatic head of liquid in the well is then diminished by pumping or bailing. The amount of liquid to be taken out will of course vary with the rate at which the water is coming in from the outside; the greater the inflow, the more liquid solution must be removed from the well. It is preferred not to lower the solution level below the approximate place at which the water is entering, provided of course that this can be estimated.

It is the intention of the inventor to so arrange his liquids in the well at the time the final reading is taken that there will be a stratum of from 3 to 15 feet of untreated water between two strata of solution, said strata being of substantial height. Persons skilled in oil well work will know how to do this.

It is not necessary to wait until such a condition is brought about, however. The electrode plates may be lowered several times through the column of liquid in the well. As soon as any material fluctuation of the voltage reading on the millivoltmeter occurs, it will be known that the electrodes have passed from the solution to the water or vice versa according to whether the voltage reading has decreased or increased. One boundary of the two liquids having been thus located, it is a simple matter to locate the other boundary. In all these measurements the amount of cable paid out is accurately measured by the graduations upon it so that the length of the water column is easily computed. Midway between the two boundaries of the water column may be assumed to be the place where most of the water is coming in, and such condition is, in fact, most often the case. The depth of such point, as read from the cable or computed, locates the leak with considerable exactness.

In case there is any considerable amount of oil in a well at the time a leak is to be located, I prefer that the bulk of the oil shall be first removed by any suitable method.

The cable by which the metallic plates are suspended may also be a rope or the electric wires by which the potential may be measured on the millivoltmeter. The word "cable" as used in the following claims may be so interpreted.

I claim as my invention:

1. In a process of the character described, the steps which comprise traversing an isolated mass of liquid electrolyte through the bore of a well, continuously and uniformly releasing said electrolyte into the fluid of the well during said traverse, diminishing the hydrostatic head within the well to allow influx of natural water and then electro-chemically determining the location of said influx.

2. In a process of the character described, the steps which comprise lowering an isolated mass of treating solution into a well, depositing said treating solution as a unitary body in the liquid in the well, allowing an inflow of connate liquid in said well, and electrically testing said treating solution to determine where same has been diluted.

3. A method of preparing a well for the testing of leakages thereinto which consists of lowering into the well a mass of electro-chemical solution, and depositing said solution as a unitary body in the liquid in said well.

4. A method of preparing a well for the testing of leakages thereinto which consists of lowering into the well a mass of testing solution, and depositing said solution as a unitary body in the liquid in said well.

In testimony whereof, I have hereunto set my hand at Los Angeles, California, this 28th day of May, 1929.

GEORGE H. ENNIS.